(12) United States Patent
Kale et al.

(10) Patent No.: US 7,050,998 B1
(45) Date of Patent: May 23, 2006

(54) INVESTMENT PORTFOLIO CONSTRUCTION METHOD AND SYSTEM

(75) Inventors: Jivendra K. Kale, Orinda, CA (US); Michael J. Best, Waterloo (CA)

(73) Assignee: Financiometrics Inc., Orinda, CA (US)

( * ) Notice: Subject to any disclaimer, the term of this patent is extended or adjusted under 35 U.S.C. 154(b) by 694 days.

(21) Appl. No.: 09/672,116

(22) Filed: Sep. 27, 2000

Related U.S. Application Data (60) Provisional application No. 60/156,271, filed on Sep. 27, 1999.

(51) Int. Cl.
*G06F 17/60* (2006.01)

(52) U.S. Cl. .......................................... 705/36; 705/35

(58) Field of Classification Search ............ 705/35–37, 705/1; 702/180–182; 707/10, 104.1; 709/203, 709/219
See application file for complete search history.

(56) References Cited

U.S. PATENT DOCUMENTS

| | | | |
|---|---|---|---|
| 5,729,700 A | | 3/1998 | Melnikoff |
| 5,761,442 A | | 6/1998 | Barr et al. |
| 5,784,696 A | * | 7/1998 | Melnikoff .................. 705/36 R |
| 5,806,049 A | | 9/1998 | Petruzzi |
| 5,812,987 A | * | 9/1998 | Luskin et al. .................. 705/36 |
| 5,884,287 A | | 3/1999 | Edesess |
| 5,930,774 A | | 7/1999 | Chennault |
| 5,946,666 A | * | 8/1999 | Nevo et al. ..................... 705/36 |
| 5,999,918 A | * | 12/1999 | Williams et al. .......... 705/36 R |
| 6,003,018 A | * | 12/1999 | Michaud et al. ............... 705/36 |
| 6,018,722 A | | 1/2000 | Ray et al. |
| 6,078,904 A | | 6/2000 | Rebane |
| 6,101,484 A | * | 8/2000 | Halbert et al. ................. 705/26 |
| 6,125,355 A | * | 9/2000 | Bekaert et al. ........... 705/36 R |
| 6,360,210 B1 | * | 3/2002 | Wallman ...................... 705/36 |
| 6,405,179 B1 | * | 6/2002 | Rebane ........................ 705/36 |
| 6,601,044 B1 | * | 7/2003 | Wallman ...................... 705/36 |

FOREIGN PATENT DOCUMENTS

| | | | |
|---|---|---|---|
| JP | 406295300 A | * | 10/1994 |
| JP | 02001312593 A | * | 11/2001 |

OTHER PUBLICATIONS

M. J. Brennan; "The Role of Learning in Dynamic Portfolio Decisions"; Jan. 1997; pp. 1-16.*
Seppo Pynnonen, Ph.D.; "Use of Modern Portfolio Theory in Systematic Portfolio Strategies"; Department of Mathematics and Statistics, University of Vaasa; May 1995; pp. 1-22.*
Ohlson, J.A. and Ziemba, W.T.; "Portfolio Selection in a Lognormal Market When the Investor has a Power Utility Function"; JSTOR—The Journal of Financial and Quantitative Analysis; vol. 11, No. 1; Mar. 1976; pp. 57-69.*

*Primary Examiner*—Ella Colbert (57) ABSTRACT

A method and a system for the optimal allocation of investment funds to construct an investment portfolio by using a two-segment, risk-averse utility function, where the first segment is a log-utility function indicative of the portfolio holder's utility for positive rates of return and reflects the portfolio holder's desire for maximizing portfolio growth, and the second segment is a power-utility function with a zero or negative power indicative of the degree to which the portfolio holder is averse to losses. An optimization algorithm determines the optimal investment weights for the assets in the investment portfolio to maximize the portfolio's expected utility, which is based on the two-segment utility function. A computer software includes modules for carrying out the optimization to determine the optimal investment weights for the assets and to thereby construct the investment portfolio. The computer software is in the form of codes executed by a processor.

6 Claims, 3 Drawing Sheets

OTHER PUBLICATIONS

Sercu, Piet; "A Note on Real and Nominal Efficient Sets"; JSTOR- The Journal of Finance; vol. 36; No. 3; Jun. 1981; pp. 721-737.*

Copland, Thomas E. and Weston, J. Fred; Financial Theory and Corporate Policy: Third Edition; Addison -Wesley Publishing Company; 1946 (Reprinted with corrections May 1992); p. 90.*

Elton, Edwin J. and Gruber, Martin J.; Modern Portfolio Theory and Investment Analysis: Fifth Edition; John Wiley & Sons, Inc.; 1981-1995; p. 234.*

Hakansson, Nils H.; "Convergence To Isoelastic Utility and Ploicy in Multiperiod Portfolio Choice"; Journal of Financial Economics 1; Feb. 1974; p. 202-224.*

Francis, Jack Clark and Archer, Stephen H; "Portfolio Analysis"; Prentice-Hall Foundations of Finance Series; 1971; pp. 208 and 209.*

Markowitz, Harry; "Portfolio Selection"; The Journal of Finance; vol. Vii, No. 1; Mar. 1952; pp. 77-91.*

Kale Ph.D., Jivendra K.; "Growth Optimization with Downside Protection, A New Paradigm for Portfolio Selection"; 2002 and 2004; Abstract.*

Best, M. J.; "A Feasible Conjugate-Direction Method to Solve Linearly Constrained Minimization Problems"; Journal of Optimization Theory and Applications; vol. 16; No. 1-2; Jul. 1975; Abstract.*

Best et al., "A Class of Accelerated Conjugate Direction methods For Linerly Constrained Minimization Problems," *Mathematics of Computation*, vol. 30, No. 1325, pp 478-504, Jul. 1976.

Grauer et al., "Higher Return, Lower Risk: Historical Returns On Long-Run, Actively Managed Portfolios Of Stocks, Bonds And Bills, 1936-1978," *Financial Analysts Journal*, Mar.-Apr. 1982, pp 39-53.

* cited by examiner

INVESTMENT PORTFOLIO CONSTRUCTION METHOD AND SYSTEM

CROSS-REFERENCES TO RELATED APPLICATIONS

The present application claims benefit of the filing date of U.S. provisional application No. 60/156,271, filed on Sep. 27, 1999 and which is incorporated herein by reference in its entirety.

BACKGROUND OF THE INVENTION

The present application relates to investment portfolios and, more particularly, to management of risk and allocation of assets in an investment portfolio. Merely by way of example, the invention is illustrated in a computing environment. But it would be recognized that the invention has a much broader range of applicability.

The evaluation and management of risk in a portfolio of assets continue to be a subject of interest by many professionals in the field of finance. The investment objectives, in terms of rates of return as well as levels of risk associated with such returns, often vary for different individuals. Furthermore, the array of factors that affect investment objectives do not easily lend themselves to simple computational algorithms. Accordingly, there appear to be many limitations with conventional techniques.

To reduce or possibly minimize risk while providing an acceptable rate of return, an investment portfolio is typically diversified so as to include various assets with different characteristics. Portfolio construction was generally reshaped in the 1950s, when the concept of portfolio theory was developed (see "Portfolio Selection", Journal of Finance 7, no. 1, March 1952, 77–91, for example). The portfolio theory—which in the field of finance is also referred to as mean variance analysis—seeks to balance the reward from the portfolio against the risk that the portfolio is exposed to, where risk is measured by the variance or standard deviation of portfolio return. The portfolio theory assumes that over the investment horizon, an array of assets—of different classes—follow a multi-variate probability distribution with finite expected value vector and covariance matrix. A portfolio constructed in conformity with the theory combines such assets in a linear fashion so as to achieve a single-dimensional probability distribution of investment returns which provides for either (1) maximum expected return for a given standard deviation (i.e., a given level of risk) or (2) a minimum standard deviation for a given expected return, or (3) maximum expected return for a given tradeoff between expected return and risk. By computing a probability distribution function of portfolio return, the theory thus provides as mathematical foundation for constructing optimal portfolios.

Figure 1:
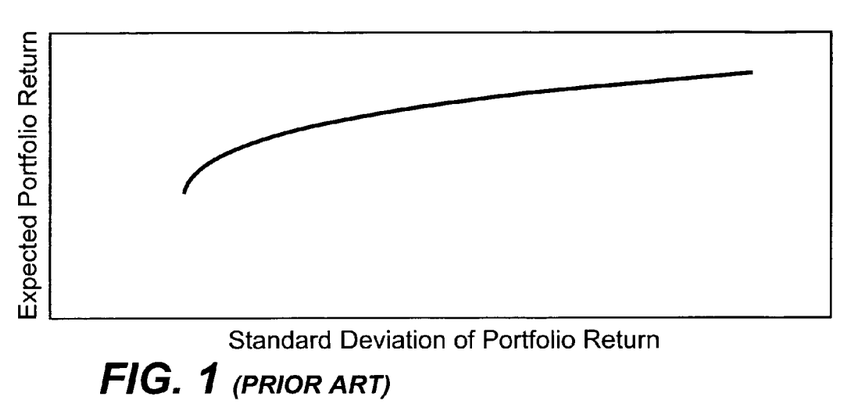
FIG. 1 shows a simplified diagram of expected return vs. standard deviation of return of a portfolio constructed using mean-variance method.
Figure 2:
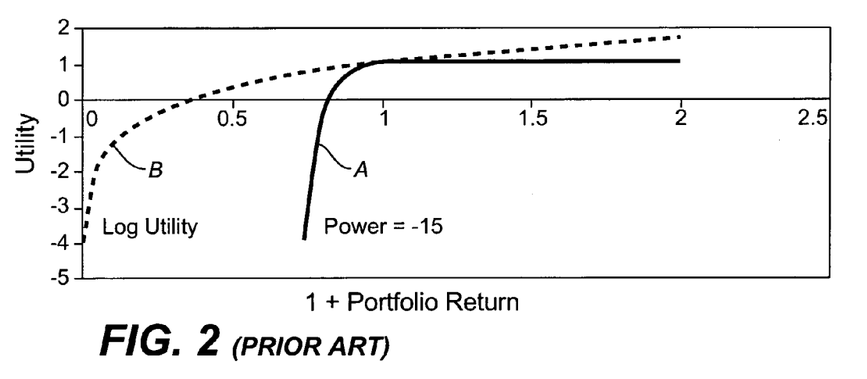
FIG. 2 shows a simplified diagram of utility vs. return of two portfolios constructed using power-utility and log-utility functions.

A plot of an expected portfolio return as a function of the standard deviation of portfolio return, also known as the efficient frontier, is shown in the simplified diagram of FIG. 1. The efficient frontier provides the maximum return for every given level of risk, or alternatively, provides the minimum risk for every level of return. Therefore, optimal portfolios often lie on the efficient frontier. To construct an efficient frontier, in accordance with the portfolio theory, the expected return and the standard deviation of the return for each asset in the portfolio, as well as, the correlation between the returns of each asset in the portfolio are estimated for a given time period. A computer software that implements the technique, typically receives the required data and generates an optimum investment weigh for each asset in the portfolio.

In mean-semivariance analysis, which is another known portfolio construction theory, the semi-variance—which is a measure of downside risk—of portfolio return is used in portfolio construction as the measure of risk. In accordance with this theory, only portfolio returns below a specified level are used in calculation of the efficient frontier plots. Like its mean-variance counterpart, the mean-semivariance uses a one-period approach for construction and optimization of a portfolio of diverse assets.

Another known method uses a power utility function to construct a portfolio. The method (hereinbelow referred to as the power-utility method) maximizes the expected utility of wealth—which is related to portfolio return—using a multi-period model which spans the investment horizon. Because the power-utility method is based on a multi-period model, it allows for modification and rebalancing of the portfolio during each period, in contrast to the mean-variance and mean-semivariance methods which are based on a one period model. In addition to the mean and the variance—which are the first two moments of a probability distribution function—that are used in the mean-variance model, described briefly above, the power-utility method uses the higher orders moments of a probability distribution function to determine the effect of a portfolio on an investor's wealth over the investment horizon. Such higher order moments include preferences for e.g. skewness and kurtosis or fat-tails.

The power utility method (see "Higher Return, Lower Risk: Historical Returns on Long-Run, Actively Managed Portfolios of Stock, Bond and Bills, 1936–1978" by Robert R. Grauer and Nils H. Hakansson, Financial Analysts Journal, pp. 39–53, March–April 1982) is based on the following power utility function:

$$U = \frac{1}{\gamma}[(1+r)^\gamma + \gamma - 1]$$

in which
U represents portfolio's utility to the portfolio holder;
r represents the portfolio's return; and
$\gamma$ represents the risk-aversion of the portfolio holder and has a value of less than or equal to 1.

A property—commonly referred to as the myopic property—of the power utility function is that it lends itself to maximization of the expected utility of wealth at the end of each period of a given multi-period investment horizon, thereby, providing for the maximization of the expected utility at the end of investment horizon.

For an individual who is risk-neutral, $\gamma$ is 1. Values of $\gamma$ less than one, including negative values, represent risk-averse investors. The higher the risk aversion, the more negative is the parameter $\gamma$. Therefore, $\gamma$ values of 0.5, 0, –1, –5, –15, respectively represent greater aversion to both decreases and increases in the portfolio value and hence to the risk associated with the portfolio.

FIG. 1 shows a simplified diagram of an investor's utility (y-axis) as a function of (1+portfolio return) (x-axis), where (1+portfolio return) is a measure of the growth in portfolio value, or wealth. Plot A in FIG. 1 corresponds to a power-utility function for an individual with a $\gamma$ of –15. As seen from this plot, a portfolio constructed in accordance with graph A, provides substantial protection against negative returns—due to its steep drop in utility as the rate of return drops—at the expense of limiting upside potential by providing low positive returns. In other words, a portfolio corresponding to plot A, immunizes the downside exposure of the portfolio while at the same time suppressing the upside potential of the portfolio.

The power utility function simplifies to the following log-utility function when γ is equal to 0:

$$U_s = 1 + \ln(1+r)$$

in which ln represents the symbol for natural logarithm.

Plot B of FIG. 1 shows the utility derived from a portfolio constructed using a log-utility function. As is well know, a portfolio selected by using the log-utility function maximizes growth over multiple periods, but as described below, such a portfolio may be very risky. Plots A and B of FIG. 1 show that the portfolio whose utility is characterized by plot B provides a higher utility at higher positive rates of returns than does the portfolio whose utility is characterized by plot A. However, the negative utility of the portfolio whose utility is characterized by plot B is not as suppressed as is the portfolio whose utility is characterized by plot A. Therefore, a portfolio whose utility is characterized by plot B is subject to a higher risk of loss than is a portfolio whose utility is characterized by plot A.

The enhanced risk of loss of the log-utility function is the by-product of the well-known fact that portfolios constructed based thereon often contain riskier assets and higher investment weight of such riskier assets, than those constructed using the power-utility functions with large negative values of γ. Therefore, although a portfolio based on a log-utility function offers a higher potential for positive returns than does a portfolio based on a power-utility function with a large negative γ, a portfolio based on a log-utility function is subject to a higher potential negative return than is a portfolio based on a power-utility function with a large negative γ.

Therefore, it is desirable to construct a diversified portfolio model that is more efficient than conventional techniques.

SUMMARY OF THE INVENTION

According to the present invention, a technique including a method and system for efficient portfolio management is provided. A method and a system, in accordance with one embodiment of the present invention, construct investment portfolios by characterizing investor preferences with utility functions which include at least two segments. The first segment, which characterizes investor preferences for positive rates of returns, is a log-utility function. The second segment, which characterizes investor preferences for negative rates of return, is a power-utility function with a negative value for power, in which the power is so selected as to account for the degree to which the portfolio holder is averse to losses, i.e. to negative returns.

In accordance with the present invention, the weight of assets in the portfolio are selected so as to maximize the expected utility of the portfolio. The weights are selected so as to account for the probability of different economic events that may occur in the future. The probability of the occurrence of each economic event is determined through analysis and correlation of past economic data.

A computer system, in accordance with the present invention, includes a processor which executes software codes to construct a portfolio in accordance with the two-segment utility function of the present invention. The software includes modules for asset identification and selection as well as modules for selection of the weight of each asset in the portfolio so as to maximize the portfolio's expected utility.

In an alternative embodiment, the invention provides a networked system for constructing a portfolio having a utility defined by at least a first function and a second function. The system has a communication network; and a computer system coupled to the communication network. The system also has a database coupled to the communication network; wherein the computer system is configured to: select a plurality of assets in the portfolio; and maximize an expected utility of the portfolio. The at least first function is a power-utility function having a first power defining the degree of risk aversion of a holder of the portfolio. The at least second function is a power-utility function having a second power defining the degree of risk aversion of the holder of the portfolio, wherein the first power is different from the second power.

The invention also includes a computer program stored on a computer-readable medium for constructing a portfolio having a utility defined by at least a first function and a second function. The program has a code for selecting a plurality of assets in the portfolio; and a code for maximizing an expected utility of the portfolio. The at least first function is a power-utility function having a first power defining the degree of risk aversion of a holder of the portfolio and the at least second function is a power-utility function having a second power defining the degree of risk aversion of the holder of the portfolio. The first power is different from the second power. Depending upon the embodiment, there can also be other functionality described herein that is implemented in one or more computer codes.

These and other benefits are described throughout the present specification and more particularly below with reference to the Figs.

DESCRIPTION OF THE SPECIFIC EMBODIMENTS

According to the present invention, a technique including a method and system for efficient portfolio management is provided. A method and a system for constructing an investment portfolio, selects and assigns a weight to each asset in the portfolio to thereby maximize the expected utility of the portfolio. The utility function—which characterizes and models preferences for investment gains and losses—of the portfolio, includes at least two segments, in accordance with the present invention.

Both segments of the utility function, in accordance with the present invention, are power-utility functions, each with a different power. The value of power for investment gains (i.e., positive returns) is set to 0. Therefore, the utility of investment gains is characterized by a log-utility function, which, advantageously, has the property of growth maximization over the investment horizon. The value of power for investment losses (i.e., negative returns), is selected so as to account for the portfolio-holder's (referred to herein below as investor) aversion to losses. The utility function U of a portfolio constructed in accordance with the present invention is characterized by following mathematical equations:

$$U = \frac{1}{\gamma}[(1+r)^\gamma + \gamma - 1] \text{ for } r < 0, \quad (1)$$

$$U = 1 + \ln(1+r) \text{ for } r \geq 0$$

Therefore, the utility function U of the portfolio is characterized by two separate functions (i.e., segments), one for positive—including zero—returns ($r \geq 0$) and one for negative returns (i.e., $r<0$). In equation (1), $\gamma$ is the power of the utility function, which is a number that is less than or equal to zero and represents the degree to which an investor is averse to losses. The greater the degree of loss aversion, the larger is the magnitude of $\gamma$.

As is seen from equation (1), the two-segment utility function U is a continuous function and has a value of 1 when the rate of return r is equal to 0. In accordance with the present invention, the function U in equation (1) is continuously differentiable (not shown), which is an important advantage of the present invention. As described below, owing to its continuous differentiability, function U in equation (1), in accordance with the present invention, lends itself to optimization by known mathematical programming algorithms through selection of the weight of each asset in the portfolio.

Figure 3:
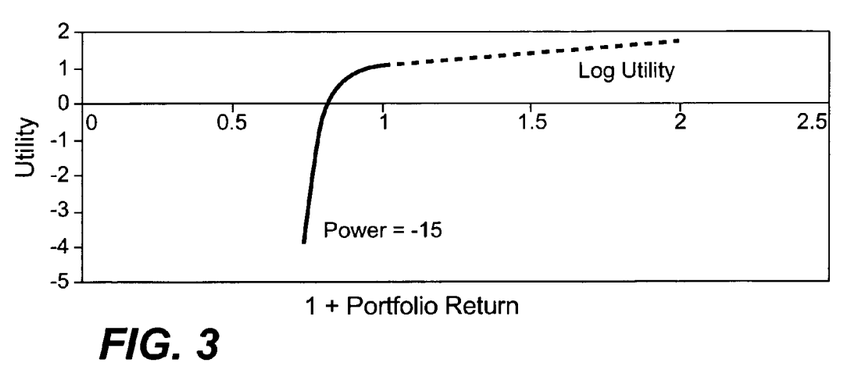
FIG. 3 shows a simplified diagram of utility vs. return for a portfolio constructed using a two-segment utility function, in accordance with one embodiment of the present invention.

FIG. 3 shows an example of the utility function U, in accordance with the present invention (see equation (1)), in which the power $\gamma$ is set to −15 for negative returns to reflect the investor's level of loss aversion. Furthermore, and in accordance with the present invention, the utility for positive returns in the function U is characterized by the log-utility function to thereby provide for growth maximization of the portfolio. The two-segment utility function U, in accordance with the present invention, enables construction of portfolios which, advantageously, on the one hand, provide for gains in accordance with growth maximization goals, while, on the other hand, allow for control of losses by accounting for the investor's degree of loss thorough the selection of the power $\gamma$.

To construct a portfolio having a utility characterized by the utility function U of equation (1), the weight associated with each asset in the portfolio is so selected as to maximize the expected utility of the portfolio. It is understood herein that an asset may be e.g. any security or investment, including but not limited to stocks, bonds, money market instruments, currencies, real-estate, derivatives, mutual funds, exchange traded funds and asset classes such as stock indices, bond indices, money market indices, country indices, economic sector assets and asset classes such as health care sector or oil sector and geographical sector asset and asset classes such as those in e.g. Latin American countries. The process for selection of the weight associated with each asset in a portfolio in order to maximize the portfolio's expected utility, once the utility function is defined and assuming the utility function possesses certain properties (i.e., it is continuous differentiable), is well-known to those skilled in the art, and is briefly described below.

Assume that there are N assets in the portfolio, characterized by utility function U of equation (1). Furthermore, assume that there are S different economic events that may affect the expected utility U of the portfolio, each economic event giving rise to a different utility value. Based on historical data or other methods of analysis and estimation, a probability point is assigned to the future occurrence of each of the S economic events. The expected utility is the weighted average of the different utilities arising under the selected economic events. Mathematically, the expected utility E(U) is:

$$E(U) = \sum_{s=1}^{S} p_s U_s \quad (2)$$

where, s corresponds to an economic event, s=1, 2, . . . , S;

$p_s$ corresponds to the probability of the occurrence of the economic event s; and $U_s$ corresponds to the investor's utility in the economic event s, which, in accordance with the present invention, and described above, includes two segments:

$$U_s = \frac{1}{\gamma}[(1+r_s)^\gamma + \gamma - 1] \text{ for } r_s < 0, \quad (3)$$

$$U_s = 1 + \ln(1+r_s) \text{ for } r_s \geq 0;$$

In the utility function defined by equation (3), $\gamma$ corresponds to the level of loss aversion;

ln corresponds to the natural log function; and $$r_s = \sum_{i=1}^{N} w_i r_{is},$$

corresponds to the portfolio's return in economic event s;

where, $r_{is}$ corresponds to the return for asset i in economic event s;

$w_i$ corresponds to the weight of asset i in the portfolio;

i corresponds to the asset number, i=1, 2, . . . , N

The expected utility of the portfolio is then maximized by selecting a proper weight for each asset in the portfolio, subject to any constraint that is optionally imposed on each asset weight, on combination of asset weights, or on any characteristic of the portfolio which is a function of the asset weights. For example, the investor may impose e.g. an upper limit on the weights of certain assets, and/or alternatively, the investor may impose e.g. an upper limit on the total investment in the securities of companies in a particular industry. The expected utility of the portfolio is optionally expanded to include penalty functions, such as the transactions costs of trading and other types of penalty costs.

Given that the utility function U of equation (1) is continuously differentiable over the entire range of returns—including a return of zero—a conventional mathematical programming algorithm may, advantageously, be used to select the optimal asset weights in a portfolio having a utility characterized by the utility function U of equation (1). One such known mathematical programming algorithm is described in an article entitled, "A Feasible Conjugate Direction Method to Solve Linearly Constrained Minimization Problems", by Michael J. Best, published in the Journal of Optimization Theory and Applications, Vol. 16, No. 1–2, pages 25–38, July 1975, which is incorporated herein by reference in its entirety.

In accordance with another embodiment of the present invention, a utility function characterizing an investor's preferences includes two or more segments each represented by a power utility function having a different $\gamma$. The process for maximization of the expected utility of such a portfolio is the same as that described above in connection with the two-segment log-power utility functions and is thus not described herein.

Figure 4:
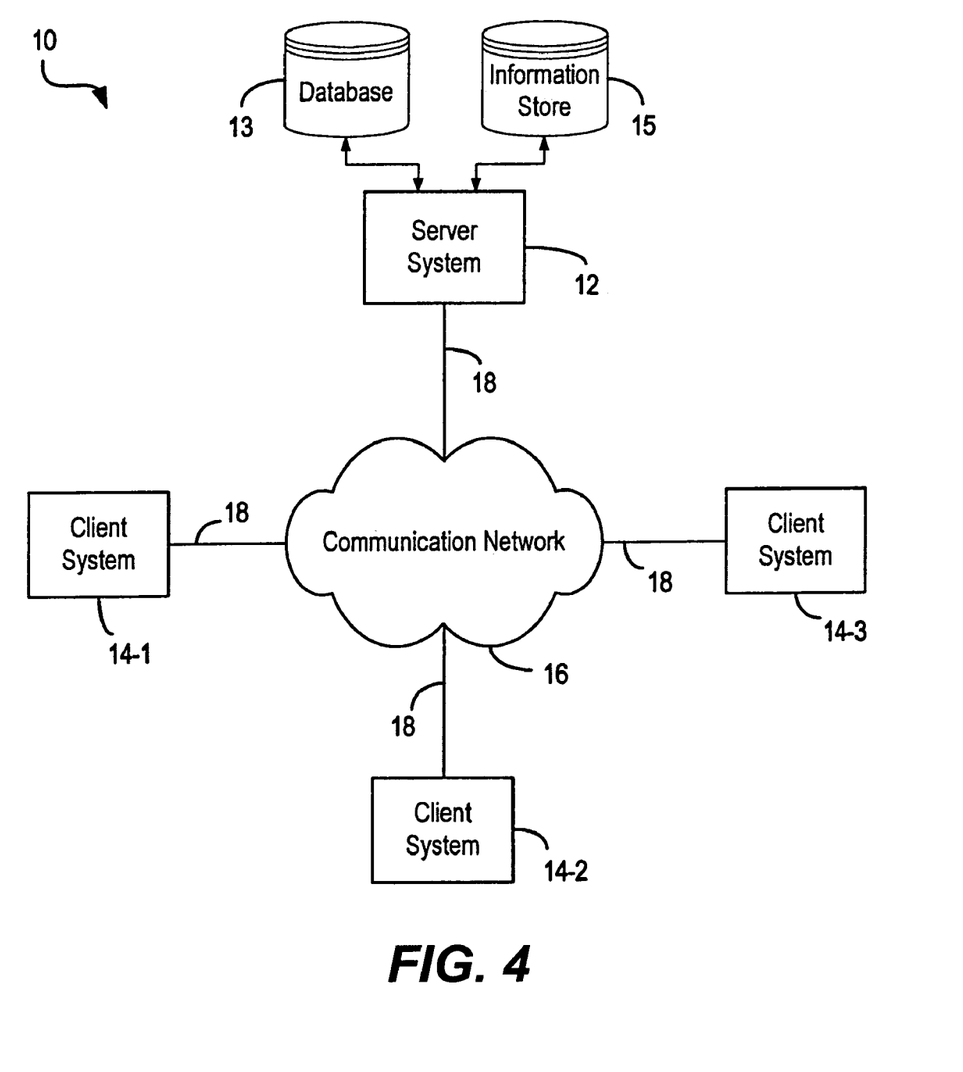
FIG. 4 shows a simplified block diagram of a distributed computer network for constructing a portfolio, in accordance with one embodiment of the present invention.

A distributed computer network 10 for constructing a portfolio, in accordance with an embodiment of this invention is shown in simplified block diagram FIG. 4. Distributed computer network 10 includes a number of computer systems 12, 14-1, 14-2, and 14-3 coupled to a communication network 16 via a plurality of communication links 18. The computer systems include a plurality of client computer systems 14-1, 14-2, and 14-3, and a server computer system 12. Client computer systems 14 typically request information from a server computer system, which processes data in response to the client request and provides the processed data to the client systems. For this reason, servers typically have more computing and storage capacity than client systems. However, a particular computer system may act as both as a client or a server depending on whether the computer system is requesting or providing information.

Communication network 16 provides a mechanism for allowing the various components of distributed computer network 10 to communicate and exchange information with each other. Communication network 16 may itself be comprised of many interconnected computer systems and communication links. Communication links 18 may be hardwire links, optical links, satellite or other wireless communications links, wave propagation links, or any other mechanisms for communication of information. While in one embodiment, communication network 16 is the Internet, in other embodiments, communication network 16 may be any suitable computer network. Distributed computer network 10 depicted in FIG. 4 is merely an illustrative embodiment of the present invention. One of ordinary skill in the art would recognize other variations, modifications, and alternatives, for example, more than one server system 12 may be coupled to communication network 16.

Server system 12 receives, processes and stores data used for portfolio construction. and stores data about a constructed portfolio. The term "server system" as used in this application may refer to a single server system as depicted in FIG. 4, or may refer to one or more server systems distributed within computer network 10. Accordingly, functions or tasks carried out, in accordance with the present invention, may be distributed to one or more servers coupled to communication network 16. In some embodiments, the servers may be isolated behind firewalls for security purposes.

In accordance with the present invention, data gathered and processed to construct a portfolio, e.g. asset weights, may be stored in an information store 15 coupled to server 12. The information store may be a database, a knowledge base, file server, or any other type of storage mechanism. The term "information store" as used in this application may refer to a single information store or to a plurality of information stores distributed within computer network 10. For example, information store 15 may be locally coupled to server 12 or may be distributed across distributed computer network 10 and accessed by server 12 via communication network 16.

Server system 12 may be configured to perform a plurality of functions, in accordance with the present invention. Such functions are typically performed by code modules executing on server system 12. Functions performed by server 12 include e.g. selecting individual assets to include in the portfolio or e.g. maximizing the expected utility of the portfolio by assigning proper asset weights to assets selected for the portfolio.

As shown in FIG. 4, a database 13 may be coupled to server 12. Database 13 may be used to store data associated with e.g. economic events, asset characteristics, rates of returns for each asset, and the like. The term "database 13" as used in this application may refer to a single database or to a plurality of databases distributed within computer network 10. For example, database 13 may be locally coupled to server 12 or may be distributed across computer network 10 and accessed by server 12 via communication network 16. Database 13 may be a relational database, an object-oriented database, a knowledge base, a flat file, or any other way of storing information. It should be apparent that although in the embodiment shown in FIG. 4, information store 15 and database 13 are shown as two separate entities, in other embodiments, information store 15 and database 13 may be combined into a single information store or database.

Client systems 14 may be used to interact with server 12. For example, client systems 14 may be used to e.g. select assets or maximize expected utility of a portfolio.

Figure 5:
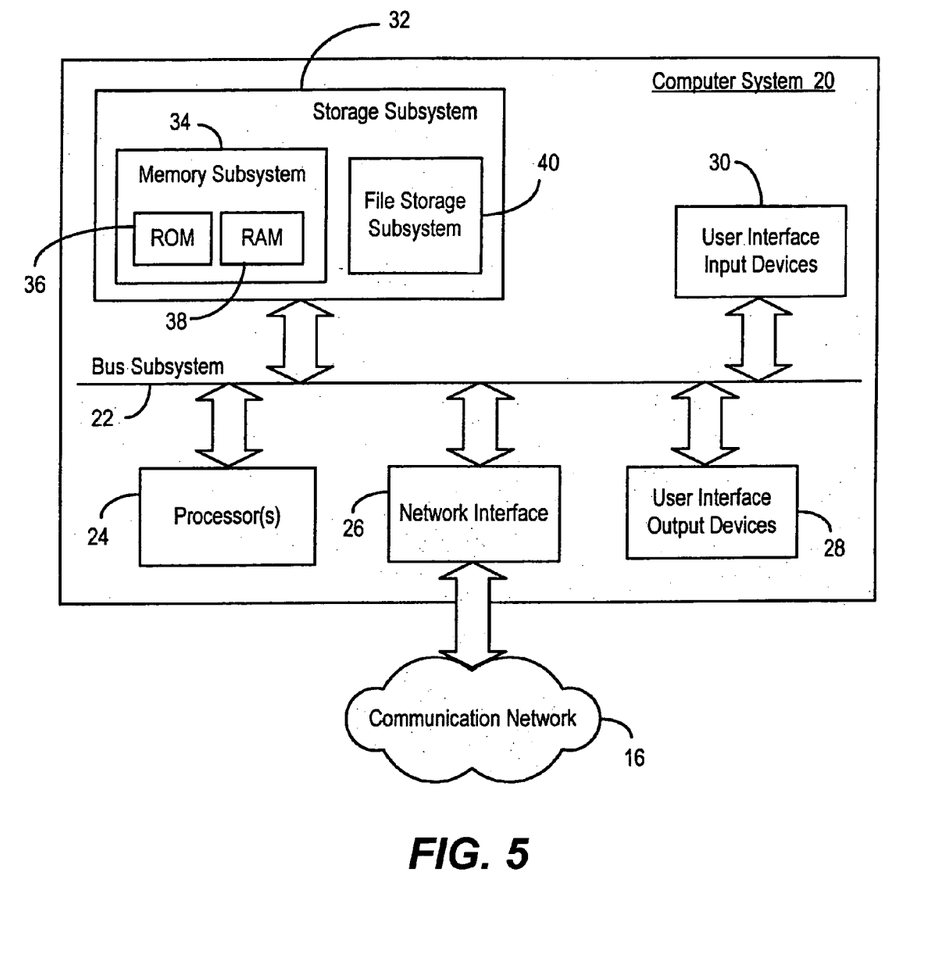
FIG. 5 shows a simplified block diagram of a computer system for constructing a portfolio, in accordance with another embodiment of the present invention.

FIG. 5 is a simplified block diagram of an exemplary computer system 20 for portfolio construction, in accordance with another embodiment of the present invention. This diagram is merely an example which should not unduly limit the scope of the claims herein. One of ordinary skill in the art would recognize many other variations, modifications, and alternatives. Computer system 20 typically includes at least one processor 24, which communicates with a number of peripheral devices via bus subsystem 22. These peripheral devices typically include a storage subsystem 32, comprising a memory subsystem 34 and a file storage subsystem 40, user interface input devices 30, user interface output devices 28, and a network interface subsystem 26. The input and output devices allow user interaction with computer system 20. It should be apparent that the user may be a human user, a device, another computer, and the like. Network interface subsystem 26 provides an interface to outside networks, including an interface to communication network 16, and is coupled via communication network 16 to corresponding interface devices in other computer systems.

User interface input devices 30 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. The term "input device" is understood to include all devices and mechanisms use to enter information into computer system 20 or onto computer network 16.

User interface output devices 28 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. The term "output device" is understood to include all devices and mechanisms used to output information from computer system 20 to a human or to another machine or computer system.

Storage subsystem 32 stores the basic programming and data constructs that provide the functionality of the various systems embodying the present invention. For example, the various modules implementing the functionality of the present invention, e.g. asset selection and expected utility maximization, may be stored in storage subsystem 32. These software modules are generally executed by processor(s) 24. In a distributed environment, the software modules may be stored on a plurality of computer systems and executed by processors of the plurality of computer systems. Storage subsystem 32 also provides a repository for storing the various databases storing e.g. economic data, in accordance with the present invention. Storage subsystem 32 typically comprises memory subsystem 34 and file storage subsystem 40.

Memory subsystem 34 typically includes a number of memories including a main random access memory (RAM) 38 for storage of instructions and data during program execution and a read only memory (ROM) 36 in which fixed instructions are stored. File storage subsystem 40 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 16. Information stored according to the teachings of the present invention may also be stored by file storage subsystem 40.

Bus subsystem 22 provides a mechanism for letting the various components and subsystems of computer system 20 communicate with each other as intended. The various subsystems and components of computer system 20 need not be at the same physical location but may be distributed at various locations within distributed network 10. Although bus subsystem 22 is shown schematically as a single bus, alternate embodiments of the bus subsystem may utilize multiple busses.

Computer system 20 itself can be of varying types including a personal computer, a portable computer, a workstation, a computer terminal, a network computer, a television, a mainframe, or any other data processing system. Client computer systems 14 and server computer systems 12 generally have the same configuration as shown in FIG. 5, with the server systems generally having more storage capacity and computing power than the client systems. Many other configurations of a computer system are possible having more or less components than the computer system depicted in FIG. 5, all of which may be used to construct a portfolio, in accordance with the present invention.

The specific embodiments of the present invention described above are illustrative and not limitative and various modifications, alterations, alternative constructions, and equivalents thereof are also encompassed within the scope of the invention. For example, the invention is not limited by any value of $\gamma$ that is selected for the negative returns of the two-segment utility function U. The invention is not limited by the specific rate of return at which the two segments of the utility function have equal values. The invention is not limited by the algorithm that is selected to maximize the expected utility of a portfolio, in accordance with the present invention. The invention is not limited by the number of segments that the utility function consists of. For example, in some embodiment, the portfolio's utility for negative returns may be characterized by a power-utility function with a power of less than or equal to 1, or by a combination of power utility functions.

The invention is not limited by the types of constraints imposed on asset weights or by the types of constrains imposed on a combination of asset weights. Nor is the invention limited by any characteristic of the portfolio—which is a function of the assets weights in the portfolio—that may be imposed during the process of portfolio construction. The invention is not limited by any expansion of the expected utility function that is made to include one or more penalty functions.

The present invention is not limited by any particular combination of hardware and software. The present invention may be implemented only in hardware or only in software or using any combinations thereof.

Additions, subtractions, deletions, and other modifications and changes to the present invention may be made thereto without departing from the scope of the present invention as is set forth in the appended claims.

What is claimed is:

1. A computer-implemented method of allocating investment funds to a plurality of assets to construct an investment portfolio having a utility defined by at least a first function $U_1$ for positive rates of returns and a second function $U_2$ for negative rates of returns, the computer-implemented method comprising:

selecting a plurality of assets in the portfolio; and allocating the investment funds to the said plurality of assets to maximize an expected utility of the investment portfolio; wherein the at least first function $U_1$ is a log-utility function wherein said log-utility function is at least characterized by the following:

$U_1 = 1 + ln(1+r)$ for $r \geq 0$ where $U_1$ presents the portfolio's utility to the portfolio holder, r represents the portfolio's return, and ln is a symbol for natural logarithm, and wherein the at least second function $U_2$ is a power-utility function wherein said power-utility function is at least characterized by the following:

$$U_2 = \frac{1}{Y}[(I+r)^y + Y - L] \text{ for } r < 0$$

where $U_2$ represents the portfolio's utility to the portfolio holder, r represents the portfolio's return, and $\gamma$ represents the loss-aversion of the portfolio holder and has a value of less than or equal to 0.

2. The method of claim 1 wherein allocating the investment finds to the plurality of assets in the investment portfolio to maximize the expected utility of the portfolio further comprises:

determining an optimal investment weight for each one of the plurality of assets in the investment portfolio.

3. The method of claim 2 wherein determining an optimal investment weight for each one of the plurality of assets in the investment portfolio further comprises:

computing the investment portfolio's return for each one s of the plurality of economic events in accordance with the following:

$$r_s = \sum_{i=1}^{N} w_i r_{is}$$

where $r_s$ corresponds to the portfolio's return in economic event s, $w_i$ corresponds to a weight of asset i in the portfolio, $r_{is}$ corresponds to a return for asset i in economic event s; i corresponds to an asset number varying from 1 to N, and wherein N corresponds to the number of assets from which the portfolio is selected;

computing $U_s$ the utility of the portfolio for the portfolio return $r_s$ in economic event s; wherein $U_s$ is the function $U_1$ for $r_s \geq 0$, and $U_s$ is the function $U_2$ for $r_s < 0$;

multiplying the utility of the portfolio computed for each economic event with the probability of the occurrence of that economic event thereby generating a plurality of values $p_s U_s$ wherein $U_s$ corresponds to the portfolio holder's utility in the economic event s; $p_s$ corresponds to a probability of occurrence of the economic event s, summing the values to compute an expected utility as defined below:

$$E(U) = \sum_{s=1}^{S} p_s U_s$$

where S corresponds to the number of possible economic events and s varies from 1 to S; and optimizing the investment weight $w_i$ for each of the N assets from which the portfolio is selected to maximize the portfolio's expected utility E(U).

4. A computer system for allocating investment funds to a plurality of assets to construct an investment portfolio having a utility defined by at least a first function $U_1$ for positive rates of returns and a second function $U_2$ for negative rates of returns, the computer system comprising:

a processor; and a memory coupled to the processor, said memory storing a plurality of code modules for execution by the processor, the plurality of code modules comprising;

a code module for selecting a plurality of assets in the portfolio; and code modules for allocating the investment funds to the said plurality of assets to maximize an expected utility of the investment portfolio; wherein the at least first function $U_1$ is a log-utility function wherein said log-utility function is at least characterized by the following:

$U_1 = 1 + ln(1+r)$ for $r \geq 0$ where $U_1$ presents the portfolio's utility to the portfolio holder, r represents the portfolio's return, and ln is a symbol for natural logarithm, and wherein the at least second function $U_2$ is a power-utility function wherein said power-utility function is at least characterized by the following:

$$U_2 = \frac{1}{Y}[(I+r)^y + Y - L] \text{ for } r < 0.$$

where $U_2$ represents the portfolio's utility to the portfolio holder, r represents the portfolio's return, and γ represents the loss-aversion of the portfolio holder and has a value of less than or equal to 0.

5. The computer system of claim 4 wherein the code modules for allocating the investment funds to the plurality of assets in the investment portfolio to maximize the expected utility of the portfolio further comprise:

code modules for determining an optimal investment weight for each one of the plurality of assets in the investment portfolio.

6. The computer system of claim 5, wherein the code modules for determining an optimal investment weight for each one of the plurality of assets in the investment portfolio further comprise:

code module for computing the investment portfolio's return for each one s of the plurality of economic events in accordance with the following:

$$r_s = \sum_{i=1}^{N} w_i r_{is}$$

where $r_s$ corresponds to the portfolio's return in economic event s, $w_i$ corresponds to a weight of asset i in the portfolio, $r_{is}$ corresponds to a return for asset i in economic event s; i corresponds to an asset number varying from 1 to N, and wherein N corresponds to the number of assets from which the portfolio is selected;

code module for computing $U_s$ the utility of the portfolio for the portfolio return $r_s$ in economic event s; wherein $U_s$ is the function $U_1$ for $r \geq 0$, and $U_s$ is the function $U_2$ for $r_s < 0$;

code module for multiplying the utility of the portfolio computed for each one of the plurality of economic events with the probability of the occurrence of that economic event thereby generating a plurality of values $p_s U_s$ wherein $U_s$ corresponds to the portfolio holder's utility in the economic event s; $p_s$ corresponds to a probability of occurrence of the economic event s;

code module for summing the values to compute an expected utility as defined below:

$$E(U) = \sum_{s=1}^{S} p_s U_s$$

where S corresponds to the number of possible economic events and s varies from 1 to S; and code module for optimizing the investment weight $w_i$ for each of the N assets from which the portfolio is selected to maximize the portfolio's expected utility E(U).

* * * * *